US012776880B2

(12) United States Patent
Li

(10) Patent No.: US 12,776,880 B2
(45) Date of Patent: Oct. 27, 2026

(54) METHOD AND DEVICE FOR BEAM INDICATION, AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 510 days.

(21) Appl. No.: 18/265,098

(22) PCT Filed: Dec. 3, 2020

(86) PCT No.: PCT/CN2020/133673

§ 371 (c)(1),
(2) Date: Jun. 2, 2023

(87) PCT Pub. No.: WO2022/116103

PCT Pub. Date: Jun. 9, 2022

(65) Prior Publication Data

US 2024/0106608 A1 Mar. 28, 2024

(51) Int. Cl.
*H04L 5/00* (2006.01)
*H04W 72/23* (2023.01)

(52) U.S. Cl.
CPC .......... *H04L 5/0053* (2013.01); *H04L 5/0091* (2013.01); *H04W 72/23* (2023.01)

(58) Field of Classification Search
CPC ... H04L 5/0053; H04L 5/0091; H04L 5/0023; H04W 72/23; H04W 16/28; H04B 7/06952; H04B 7/088; H04B 7/063; H04B 7/024; H04B 7/06968
See application file for complete search history.

(56) References Cited

U.S. PATENT DOCUMENTS

| | | | | |
|---|---|---|---|---|
| 10,849,187 | B2 | 11/2020 | Tsai et al. | |
| 2020/0107341 | A1 * | 4/2020 | Zhang | H04B 7/06968 |
| 2022/0103207 | A1 * | 3/2022 | Miao | H04B 7/024 |
| 2023/0047505 | A1 * | 2/2023 | Zhang | H04W 16/28 |

FOREIGN PATENT DOCUMENTS

| | | |
|---|---|---|
| CN | 110089181 A | 8/2019 |
| CN | 110971361 A | 4/2020 |
| CN | 111106863 A | 5/2020 |

(Continued)

OTHER PUBLICATIONS

PCT/CN2020/133673, English translation of Search Report dated May 28, 2021, 2 pages.

(Continued)

*Primary Examiner* — Kiet Tang
(74) *Attorney, Agent, or Firm* — Cozen O'Connor

(57) ABSTRACT

A method for beam indication, performed by a terminal, includes: determining a first signaling, in which the first signaling is configured to indicate beam information of a plurality of control resource sets. The first signaling may indicate various combinations of target transmission configuration indication state IDs and control resource set IDs. By means of the disclosure, signaling overhead and latency can be reduced, and consistency of beam updating of a plurality of control resource sets can be ensured.

16 Claims, 5 Drawing Sheets

(56) References Cited

FOREIGN PATENT DOCUMENTS

| | | | |
|---|---|---|---|
| CN | 111344994 | A | 6/2020 |
| CN | 111586858 | A | 8/2020 |
| WO | WO 2020225081 | A1 | 11/2020 |

OTHER PUBLICATIONS

European Patent Application No. 20963949.1, partial Search Report and Opinion dated Aug. 21, 2024, 15 pages.

Fraunhofer Iis et al. "Enhancements on multi-TRP/panel transmission" 3GPP TSG RAN WG1 Meeting #97, R1-1907054, May 2019, 5 pages.

Chinese Patent Application No. 202080003915.1, Office Action with English translation dated Feb. 28, 2025, 12 pages.

Indian Patent Application No. 202347043959 Office Action dated May 13, 2026, 6 pages.

* cited by examiner

METHOD AND DEVICE FOR BEAM INDICATION, AND STORAGE MEDIUM

CROSS-REFERENCE TO RELATED APPLICATION

This application is a national phase of International Application No. PCT/CN2020/133673, filed on Dec. 3, 2020, the entire content of which is incorporated herein by reference.

TECHNICAL FIELD

The disclosure relates to the field of communication technologies, and in particular, to a method for beam indication, a device for beam indication and a storage medium.

BACKGROUND

Since high-frequency channels attenuate rapidly in new radio (NR) technologies such as in the communication frequency band designated as frequency range 2, beam-based transmission and reception may be used to ensure network coverage. When a network device (such as a base station) has multiple transmission reception points (TRPs), multiple TRPs may be used to provide services for a terminal, for example, multiple TRPs may be used to send a physical downlink control channel (PDCCH) to the terminal.

SUMMARY

According to a first aspect of the disclosure, a method for beam indication is provided. The method for beam indication is applicable to a terminal. The method for beam indication includes: determining a first signaling, in which the first signaling is configured to indicate beam information of a plurality of control resource sets (CORESETs).

According to a second aspect of the disclosure, a method for beam indication is provided. The method for beam indication is applicable to a network device. The method for beam indication includes: sending a first signaling, in which the first signaling is configured to indicate beam information of a plurality of CORESETs.

According to a third aspect of the disclosure, a device for beam indication is provided. The device for beam indication includes a processor; and a memory for storing instructions executable by the processor; in which the processor is configured to perform the method for beam indication described in the first aspect.

According to a fourth aspect of the disclosure, a device for beam indication is provided. The device for beam indication includes a processor; and a memory for storing instructions executable by the processor; in which the processor is configured to perform the method for beam indication described in the second aspect.

According to a fifth aspect of the disclosure, a non-transitory computer-readable storage medium having stored therein instructions is provided. When the instructions are executed by a processor of a mobile terminal, the mobile terminal is caused to perform the method for beam indication described in the first aspect.

According to a sixth aspect of the disclosure, a non-transitory computer-readable storage medium having stored therein instructions is provided. When the instructions are executed by a processor of a network device, the network device is caused to perform the method for beam indication described in the second aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different accompanying drawings represent the same or similar elements unless otherwise represented. The implementations set forth in the following description of the embodiments do not represent all implementations consistent with the disclosure. Instead, they are merely examples of apparatuses and methods consistent with aspects related to the disclosure as recited in the appended claims.

Figure 1:
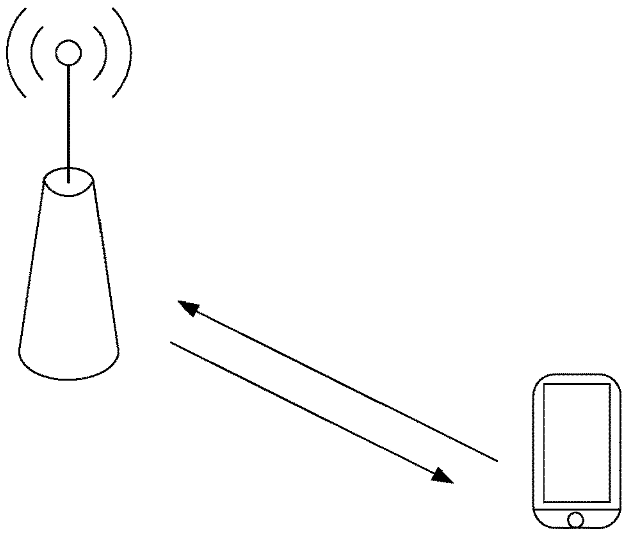
FIG. 1 is a schematic diagram of a wireless communication system, according to some embodiments.

The data transmission method provided in embodiments of the disclosure can be applicable to a wireless communication system illustrated in FIG. 1. Referring to FIG. 1, the wireless communication system includes a terminal and a network device. The terminal is connected to the network device, sends data to the network device and receives data from the network device, through wireless resources.

It can be understood that the wireless communication system illustrated in FIG. 1 is only a schematic illustration. The wireless communication system may also include other network devices, such as core network devices, wireless relay devices and wireless backhaul devices, which are not illustrated in FIG. 1. The embodiments of the disclosure do not limit the number of network devices and the number of terminals in the wireless communication system.

It can be further understood that the wireless communication system according to embodiments of the disclosure is a network that provides a wireless communication function. The wireless communication system can employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), carrier sense multiple access with collision avoidance. According to the capacity, speed, delay and other factors of different networks, the networks can be divided into 2G (second generation) network, 3G (third generation) network, 4G (fourth generation) network or future evolution network such as 5G (fifth generation) network. The 5G network can also be called a new radio (NR) network. For convenience of description, the disclosure sometimes refers to the wireless communication network simply as the network.

Furthermore, the network device involved in the disclosure may also be referred to as a radio access network device. The radio access network device may be: a base station, an evolved node B (eNB), a home base station, an access point (AP) in a wireless fidelity (WIFI) system, a wireless relay node, a wireless backhaul node, a transmission point (TP), a transmission and reception point (TRP), etc. The radio access network device may also be a next generation node base station (gNB) in an NR system or a component or part of a device that constitutes the base station or the like. When it is a vehicle-to-everything (V2X) communication system, the network device may also be an in-vehicle device. It should be understood that, in embodiments of the disclosure, the specific technology and specific device form adopted by the network device are not limited.

Furthermore, the terminal involved in the disclosure may also be referred to as a terminal equipment, a user equipment (UE), a mobile station (MS), a mobile terminal (MT) or the like, which is a device that provides voice and/or data connectivity of a user. For example, the terminal may be a handheld device, an in-vehicle device or the like, with a wireless connectivity function. At present, some examples of terminals are: a smart phone, a pocket personal computer (PPC), a palmtop computer, a personal digital assistant (PDA), a notebook computer, a tablet computer, a wearable device, an in-vehicle device or the like. In addition, when it is a V2X communication system, the terminal device may also be an in-vehicle device. It should be understood that embodiments of the disclosure do not limit the specific technology and specific device form adopted by the terminal.

In the disclosure, data transmission is performed between the network device and the terminal based on beams. During data transmission based on beams, the network device (e.g., the base station) may use multiple TRPs (also referred to as Multi-TRP) to send the PDCCH to the terminal. In the related art, when the network device (e.g., the base station) uses one TRP to send the PDCCH to the terminal, it configures a transmission configuration indication (TCI) state for the terminal to receive the PDCCH. For example, the configuration manner is: configuring one CORESET such as CORESET #1 for the terminal, and configuring the corresponding TCI state used when the terminal receives the PDCCH in resources of CORESET #1 to be TCI #1. A search space set (SS set) may also configured for the terminal, which is associated with CORESET #1. When the terminal receives the PDCCH on resources in the SS set, it uses the beam corresponding to TCI #1 for reception. Currently, each SS set can only be associated with one CORESET and each CORESET is configured with only one TCI state.

Furthermore, in order to realize that multiple TRPs are used to send the same PDCCH to improve the reliability of the PDCCH, there are currently several manners.

Manner 1: two TCI states are configured for one CORESET. If one SS set is configured to be associated with this CORESET, the SS set can correspond to two TCI states; or if two SS sets are configured to be associated with this CORESET, each SS set corresponds to one of the TCI states.

Manner 2: one SS set is configured, this SS set is associated with two CORESETs, each CORESET corresponds to one TCI state, and then the SS set can correspond to two TCI states.

Manner 3: two CORESETs are configured, one TCI state is configured for each CORESET, and the SS set is configured to be associate with the two CORESETs respectively. That is, two SS sets are configured, which are associated with different CORESETs and correspond to different TCI states.

For Manner 2 and Manner 3, since different CORESETs are used and the TCI state indication of each CORESET is independent, if the update indications of the TCI states of the two associated CORESETs continue to be independent, it will bring the large signaling overhead and delay. For the update indications for the two TCI states, there may also be a phenomenon that the terminal successfully receives one and fails to receive another.

In view of this, embodiments of the disclosure provide a method for beam indication, which implements the joint indication signaling to indicate the beam information of the plurality of associated CORESETs used for the PDCCH repeated transmission, thereby reducing the signaling overhead and delay as well as ensuring the beam update consistency for the plurality of CORESETs.

For convenience of description in embodiments of the disclosure, the signaling used to indicate the beam information of the plurality of CORESETs is referred to as a first signaling.

Figure 2:
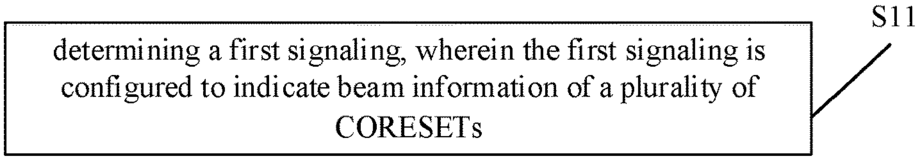
FIG. 2 is a flow chart of a method for beam indication applicable to a terminal, according to some embodiments.

FIG. 2 is a flow chart of a method for beam indication, according to some embodiments. As illustrated in FIG. 2, the method for beam indication is applicable to a terminal and includes the following step.

In step S11, a first signaling is determined.

The first signaling is configured to indicate beam information of a plurality of CORESETs.

In some embodiments of the disclosure, the first signaling may be an indication signaling sent by a network device. The indication signaling is configured to indicate the beam information of the plurality of (typically 2) CORESETs.

The terminal receives the indication signaling sent by the network device. The received indication signaling is configured to indicate the beam information of the plurality of (typically 2) CORESETs.

In some embodiments of the disclosure, the beam information of the plurality of CORESETs is indicated by the first signaling, which may realize that the joint indication signaling is used to indicate the beam information of the plurality of CORESETs, for the plurality of associated CORESETs that are used for the PDCCH repeated transmission, thereby reducing the signaling overhead and time delay and ensuring the beam update consistency of the plurality of CORESETs. For example, for the associated two CORESETs used for the PDCCH repeated transmission, the joint indication signaling is configured to indicate the beam information of the two CORESETs, thereby reducing the signaling overhead and delay and ensuring the beam update consistency of the two CORESETs.

Figure 3:
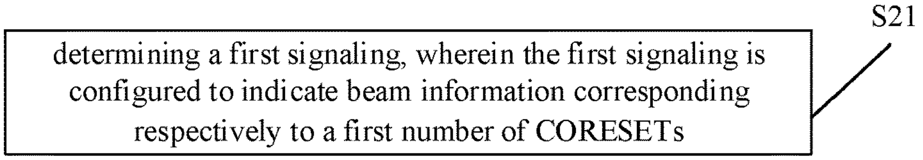
FIG. 3 is a flow chart of a method for beam indication, according to some embodiments.

FIG. 3 is a flow chart of a method for beam indication, according to some embodiments. As illustrated in FIG. 3, the method for beam indication is applicable to the terminal and includes the following step.

In step S21, a first signaling is determined, in which the first signaling is configured to indicate beam information corresponding respectively to a first number of CORESETs.

In an example, the first signaling may be configured to indicate one piece of beam information corresponding respectively to each of the two CORESETs.

In some embodiments of the disclosure, the beam information corresponding to the CORESET may include a TCI state ID and may also include a corresponding CORESET ID.

In some embodiments of the disclosure, the TCI state ID corresponds to the CORESET ID, and each TCI state ID corresponds to one TCI state. Each TCI state corresponds to a reference signal ID. The reference signal ID is configured to instruct the terminal to use the same reception beam as the reference signal to receive the PDCCH sent in resources of the CORESET corresponding to the TCI state ID.

The CORESET ID corresponding to the TCI state ID can be understood as the beam corresponding to the TCI state ID is a beam used to receive the PDCCH sent on resources of the CORESET corresponding to the CORESET ID.

In some embodiments of the disclosure, for convenience of description below, the TCI state ID indicated in the first signaling and corresponding to the CORESET ID is referred to as the target TCI state ID. Each target TCI state ID corresponds to one TCI state. Each TCI state corresponds to a reference signal ID. The reference signal ID is configured to instruct the terminal to use the same reception beam as the reference signal to receive the PDCCH sent in resources of the CORESET corresponding to the target TCI state ID.

Figure 4:
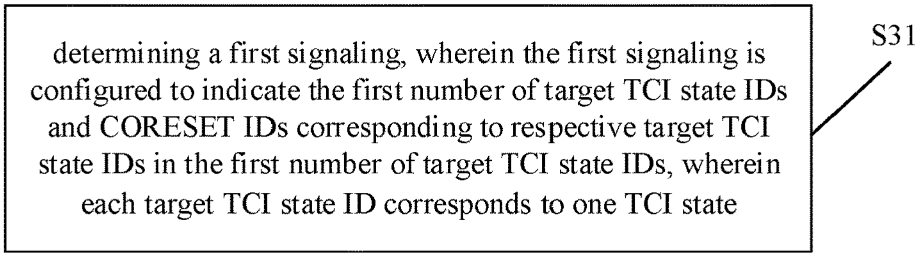
FIG. 4 is a flow chart of a method for beam indication, according to some embodiments.

FIG. 4 is a flow chart of a method for beam indication, according to some embodiments. As illustrated in FIG. 4, the method for beam indication is applicable to the terminal and includes the following step.

In step S31, a first signaling is determined, in which the first signaling is configured to indicate the first number of target TCI state IDs and CORESET IDs corresponding to respective target TCI state IDs in the first number of target TCI state IDs, and each target TCI state ID corresponds to one TCI state.

In some embodiments of the disclosure, in response to the first signaling indicating the first number of CORESET IDs, all CORESET IDs in the first number of CORESET IDs may be indicated explicitly. Or, in response to the first signaling indicating the first number of CORESET IDs, all CORESET IDs in the first number of CORESET IDs may be indicated implicitly. Or, in response to the first signaling indicating the first number of CORESET IDs, a part of CORESET IDs in the first number of CORESET IDs may be indicated explicitly and another part of CORESET IDs in the first number of CORESET IDs may be indicated implicitly.

The explicit indication can be understood as directly indicating the CORESET ID or using bit(s) corresponding to the CORESET ID to indicate the CORESET ID, that is, each bit or each few bits in different positions in the first signaling correspond to different CORESET IDs.

The implicit indication can be understood as indirectly indicating the CORESET ID. For example, when the first signaling indication is sent using resources of the first CORESET, it is implicitly indicated that the CORESET ID corresponding to the target TCI state ID indicated by the first signaling indication includes the CORESET ID of the first CORESET.

In some embodiments, the manner of implicitly indicating the CORESET ID is suitable for DCI signaling indication.

In the method for beam indication provided in embodiments of the disclosure, the first signaling may be a medium access control (MAC) control element (CE) signaling.

In an example, the MAC CE signaling indicates one piece of beam information corresponding respectively to each of the two CORESETs.

In an example, the MAC CE indicates two target activated TCI state IDs and indicates one CORESET ID corresponding to each target TCI state ID. Each TCI state ID corresponds to one TCI state. Each TCI state corresponds to a reference signal ID. The reference signal ID is configured to instruct the terminal to use the same reception beam as the reference signal to receive the PDCCH sent in resources of the CORESET corresponding to the target TCI state ID.

In an implementation manner of embodiments of the disclosure, the target TCI state ID may be indicated through a radio resource control (RRC) signaling or MAC CE signaling.

The target TCI state ID is a target TCI state ID activated by the MAC CE signaling in a TCI state ID list.

For example, the first signaling further includes the RRC signaling, the RRC signaling indicates the TCI state ID list of each CORESET, and the MAC CE signaling indicates the target TCI state ID corresponding to each CORESET, in which the target TCI state ID is the TCI state ID in the TCI state ID list of each CORESET. The TCI state ID list corresponding to each CORESET indicated by the RRC signaling may be the same or different, which is not limited herein.

In the method for beam indication provided in embodiments of the disclosure, the first signaling may be a downlink control information (DCI) signaling.

In an example, the DCI signaling indicates one piece of beam information corresponding respectively to each of the two CORESETs.

In an example, the DCI signaling indicates two target TCI state IDs, and indicates one CORESET ID corresponding to each target TCI state ID. Each TCI state ID corresponds to one TCI state. Each TCI state corresponds to a reference signal ID, and the reference signal ID is configured to instruct the terminal to use the same reception beam as the reference signal to receive the PDCCH sent in resources of the CORESET corresponding to the target TCI state ID.

The target TCI state ID is one of a plurality of TCI state IDs indicated by the MAC CE signaling.

For example, the first signaling further includes the MAC CE signaling, and the MAC CE signaling indicates two CORESET IDs and a plurality of activated TCI state IDs corresponding respectively to each CORESET ID. For example, the MAC CE activates the plurality of TCI state IDs, and one or more of the plurality of TCI state IDs activated by the MAC CE can be used as the target TCI state ID. The DCI signaling indicates one target TCI state ID for each CORESET ID. Each TCI state ID corresponds to one TCI state. The MAC CEs for activating the plurality of TCI state IDs corresponding respectively to the two CORESET IDs are the same MAC CE signaling or different MAC CE signalings, which is not limited herein.

In some embodiments, for each CORESET ID, the plurality of TCI state IDs indicated by the MAC CE signaling are the plurality of TCI state IDs in the TCI state ID list. For example, the first signaling further includes the RRC signaling, in which the RRC signaling indicates the TCI state ID list corresponding to each CORESET, and the MAC CE signaling indicates the plurality of TCI state IDs in the TCI state ID list corresponding to each CORESET. The TCI state ID list corresponding to each CORESET indicated by the RRC signaling may be the same or different, which is not limited herein.

Figure 5:
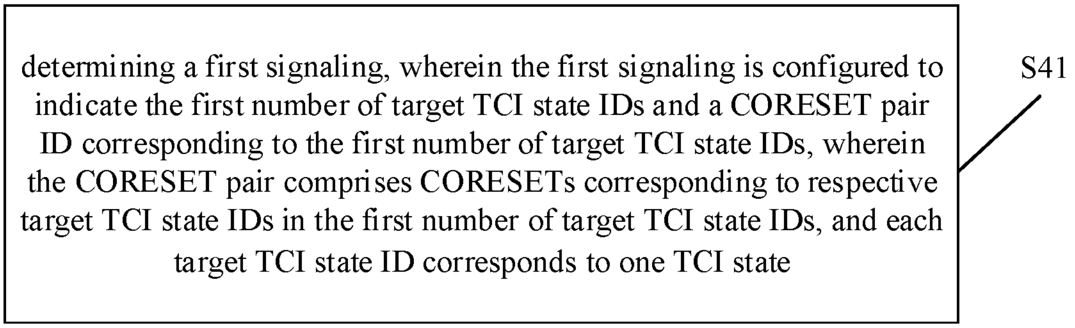
FIG. 5 is a flow chart of a method for beam indication, according to some embodiments.

FIG. 5 is a flow chart of a method for beam indication, according to some embodiments. As illustrated in FIG. 5, the method for beam indication is applicable to the terminal and includes the following step.

In step S41, a first signaling is determined, in which the first signaling is configured to indicate the first number of target TCI state IDs and a CORESET pair ID corresponding to the first number of target TCI state IDs, in which the CORESET pair includes CORESETs corresponding to respective target TCI state IDs in the first number of target TCI state IDs, and each target TCI state ID corresponds to one TCI state ID.

In some embodiments of the disclosure, in response to the first signaling indicating the CORESET pair ID, the CORESET pair ID may be indicated implicitly or explicitly.

The explicit indication can be understood as directly indicating the CORESET pair ID, or using bit(s) corresponding to the CORESET pair ID to indicate the CORESET pair ID, that is, each bit or each few bits in different positions in the first signaling correspond to different CORESET pair IDs.

The implicit indication can be understood as indirectly indicating the CORESET pair ID. For example, using resources in any CORESET included in the CORESET pair to send the first signaling means that the target TCI state ID indicated by the first signaling is the beam information used to indicate the CORESET pair.

In the method for beam indication provided in embodiments of the disclosure, the first signaling may be a MAC CE signaling.

In an example, the MAC CE signaling indicates one piece of beam information corresponding respectively to each of the two CORESETs.

In an example, the MAC CE signaling indicates two activated target TCI state IDs, and one CORESET pair ID corresponding to the two activated target TCI state IDs. Each target TCI state ID corresponds to one TCI state.

In an implementation manner of embodiments of the disclosure, the target TCI state ID may be indicated through a RRC signaling or MAC CE signaling.

For example, the first signaling further includes the RRC signaling, the RRC signaling indicates the TCI state ID list of each CORESET, and the MAC CE indicates the target TCI state ID corresponding to each CORESET, in which the target TCI state ID is one TCI state of the TCI state ID list of each CORESET. The TCI state ID list corresponding to each CORESET indicated by the RRC signaling may be the same or different, which is not limited herein.

In some embodiments of the disclosure, the CORESET ID corresponding to the CORESET pair may be indicated through the RRC signaling or MAC CE signaling. For example, the first signaling further includes the RRC signaling, and the RRC signaling further indicates two CORESET IDs corresponding to the CORESET pair ID.

In the method for beam indication provided in embodiments of the disclosure, the first signaling may be a DCI signaling.

In an example, the DCI signaling indicates one piece of beam information corresponding respectively to each of the two CORESETs.

In an example, the DCI signaling indicates two target TCI state IDs, and one CORESET pair ID corresponding to the two target TCI state IDs. Each TCI state ID corresponds to one TCI state. Each TCI state corresponds to a reference signal ID, and the reference signal ID is used to instruct the terminal to use the same receive beam as the reference signal to receive the PDCCH sent in resources of the CORESET corresponding to the target TCI state ID.

The target TCI state ID is one of a plurality of TCI state IDs indicated by the MAC CE signaling.

For example, the first signaling further includes the MAC CE signaling, and the MAC CE indicates two CORESET IDs and a plurality of activated TCI state IDs respectively corresponding to each CORESET ID. For example, one or more of the plurality of TCI state IDs activated by the MAC CE may be used as the target TCI state ID. The DCI signaling indicates one target TCI state ID for each CORESET ID. Each TCI state ID corresponds to one TCI state. The MAC CE signalings for activating the plurality of TCI state IDs respectively corresponding to the two CORESET IDs is the same MAC CE signaling or different MAC CE signalings, which is not limited herein.

In some embodiments of the disclosure, the CORESET ID corresponding to the CORESET pair may be indicated through the RRC signaling and/or MAC CE signaling. For example, the first signaling further includes the MAC CE signaling, and the MAC CE signaling further indicates two CORESET IDs corresponding to the CORESET pair ID. For another example, the first signaling further includes the RRC signaling, and the RRC further indicates two CORESET IDs corresponding to the CORESET pair ID.

In an implementation manner of embodiments of the disclosure, the target TCI state ID may be indicated through the RRC signaling or MAC CE signaling.

For example, the first signaling further includes the RRC signaling, the RRC signaling indicates the TCI state ID list corresponding to each CORESET, and the MAC CE signaling indicates the plurality of TCI state IDs in the TCI state ID list corresponding to each CORESET. The TCI state ID list corresponding to each CORESET indicated by the RRC signaling may be the same or different, which is not limited herein.

In the method for beam indication provided in embodiments of the disclosure, the first signaling includes the DCI signaling, and the DCI signaling is configured to indicate a codepoint. The first signaling further includes a second MAC CE signaling. The second MAC CE is configured to indicate a CORESET ID or a CORESET pair ID, and a target TCI state ID, corresponding to the codepoint. For example, the DCI signaling directly gives the codepoint, and the second MAC CE signaling indicates: which TCI state of which CORESET ID each codepoint corresponds to, or which TCI state of which two CORESET IDs respectively each codepoint corresponds to, or which one or which two TCI state IDs of which CORESET pair ID each codepoint corresponds to, or which one or which two TCI state IDs of which CORESET pair ID each codepoint corresponds to and the CORESET ID corresponding to the CORESET pair ID. Furthermore, if the second MAC CE signaling does not indicate the CORESET ID corresponding to the CORESET pair ID, the RRC signaling indicates the CORESET ID corresponding to the CORESET pair ID.

Figure 6:
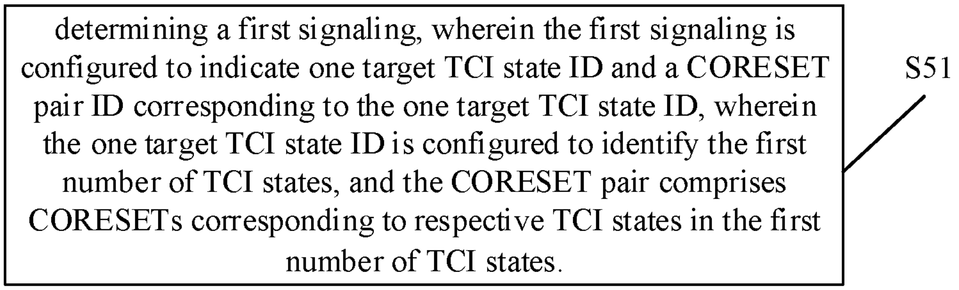
FIG. 6 is a flow chart of a method for beam indication, according to some embodiments.

FIG. 6 is a flow chart of a method for beam indication, according to some embodiments. As illustrated in FIG. 6, the method for beam indication is applicable to the terminal and includes the following step.

In step S51, a first signaling is determined, in which the first signaling is configured to indicate one target TCI state ID and a CORESET pair ID corresponding to the one target TCI state ID, in which the one target TCI state ID is configured to identify the first number of TCI states.

The CORESET pair includes CORESETs corresponding to respective TCI states in the first number of TCI states.

In embodiments of the disclosure, in response to the first signaling indicating the CORESET pair ID, the CORESET pair ID can be indicated implicitly or explicitly.

The explicit indication can be understood as directly indicating the CORESET pair ID or using bit(s) corresponding to the CORESET pair ID to indicate the CORESET pair ID, that is, each bit or each few bits in different positions in the first signaling corresponds to different CORESET pair IDs.

The implicit indication can be understood as indirectly indicating the CORESET pair ID. For example, using resources in any CORESET in the CORESET pair to send the first signaling means that the target TCI state ID indicated by the first signaling is the beam information used to indicate the CORESET pair.

In the method for beam indication provided in embodiments of the disclosure, the first signaling may be a MAC CE signaling.

In an example, the MAC CE signaling indicates one piece of beam information corresponding respectively to each of the two CORESETs.

In an example, the MAC CE signaling indicates one activated TCI state ID, and one CORESET pair ID corresponding to one activated TCI state ID. The TCI state ID includes two TCI states, and each TCI state corresponds to one of the two CORESETs corresponding to the CORESET pair ID.

In some embodiments of the disclosure, the CORESET ID corresponding to the CORESET pair may be indicated through the RRC signaling or MAC CE signaling. For example, the first signaling further includes the RRC signaling, and the RRC signaling indicates two CORESET IDs corresponding to the CORESET pair ID.

In an implementation manner of embodiments of the disclosure, the target TCI state ID may be indicated through the RRC signaling or MAC CE signaling.

For example, the first signaling further includes the RRC signaling. The RRC signaling indicates a TCI state ID list corresponding to the CORESET pair ID. Each TCI state ID in the list may only indicate the TCI state of one CORESET or indicate TCI states corresponding respectively to two CORESETs. If the TCI state of one CORESET is indicated, the other is unchanged. Or if each TCI state ID in this list indicates the TCI states corresponding respectively to the two CORESETs, but one of the two TCI states corresponding to different TCI state IDs may have the same TCI state corresponding to one CORESET.

In the method for beam indication provided in embodiments of the disclosure, the first signaling may be a DCI signaling.

In an example, the DCI signaling indicates one piece of beam information corresponding respectively to each of the two CORESETs.

In an example, the DCI signaling indicates one target TCI state ID, and one CORESET pair ID corresponding to the one target TCI state ID. The target TCI state ID contains two TCI states, and each TCI state corresponds to one of the two CORESETs corresponding to the CORESET pair ID.

The target TCI state ID is one of a plurality of TCI state IDs indicated by the MAC CE signaling.

For example, the MAC CE signaling indicates one CORESET pair ID and a plurality of activated target TCI state IDs corresponding to the CORESET pair ID. The target TCI state ID includes two TCI states, and each TCI state corresponds to one of the two CORESETs corresponding to the CORESET pair ID.

In some embodiments of the disclosure, the CORESET ID corresponding to the CORESET pair may be indicated through the RRC signaling or MAC CE signaling. For example, the first signaling further includes the RRC signaling, and the RRC signaling indicates two CORESET IDs corresponding to the CORESET pair ID. For another example, the first signaling further includes the MAC CE signaling, and the MAC CE signaling indicates two CORESET IDs corresponding to the CORESET pair ID.

In an implementation manner of embodiments of the disclosure, the target TCI state ID may be indicated through the RRC signaling or MAC CE signaling.

For example, the RRC signaling indicates a TCI state ID list corresponding to the CORESET pair ID. Each TCI state ID in this list may only indicate the TCI state of one CORESET or the TCI states corresponding respectively to two CORESETs. If only the TCI state of one CORESET is indicated, the other is unchanged. Or each TCI state ID in this list indicates the TCI states respectively corresponding to the two CORESETs, but one of the two TC states corresponding to different TCI state IDs may have the same TCI state corresponding to one CORESET.

In the method for beam indication provided in embodiments of the disclosure, in the case of using PDCCH candidates of the plurality of CORESETs to repeatedly send the PDCCH of the multi-TRP, the joint beam indication is performed for the plurality of associated CORESETs, which can reduce the signaling overhead and reduce delay.

Figure 7:
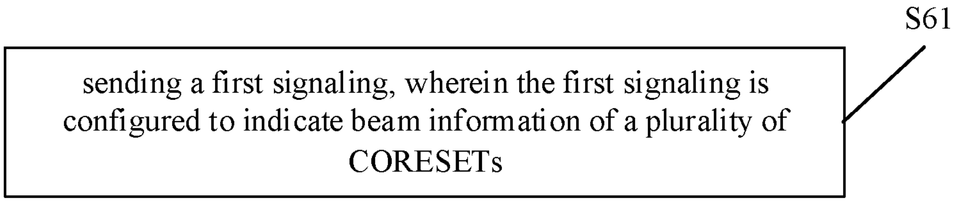
FIG. 7 is a flow chart of a method for beam indication applicable to a network device, according to some embodiments.

FIG. 7 is a flow chart of a method for beam indication, according to some embodiments. As illustrated in FIG. 7, the method for beam indication is applicable to a network and includes the following step.

In step S61, a first signaling is sent, in which the first signaling is configured to indicate beam information of a plurality of CORESETs.

The first signaling sent by the network device in some embodiments of the disclosure is used to indicate the beam information of the plurality of (typically 2) CORESETs.

It can be understood that, in some embodiments of the disclosure, the first signaling sent by the network device may correspond to the first signaling received by the terminal.

In an implementation manner, in the method for beam indication provided in embodiments of the disclosure, the first signaling is configured to indicate beam information corresponding respectively to a first number of CORESETs.

In an implementation manner, in the method for beam indication provided in embodiments of the disclosure, the first signaling is configured to indicate the first number of target TCI state IDs and CORESET IDs corresponding to respective target TCI state IDs in the first number of target TCI state IDs, in which each target TCI state ID corresponds to one TCI state.

In an implementation manner, in the method for beam indication provided in embodiments of the disclosure, the first signaling is configured to indicate the first number of target TCI state IDs and a CORESET pair ID corresponding to the first number of target TCI state IDs, in which the CORESET pair includes CORESETs corresponding to respective target TCI state IDs in the first number of target TCI state IDs and each target TCI state ID corresponds to one TCI state.

In an implementation manner, in the method for beam indication provided in embodiments of the disclosure, the first signaling is configured to indicate one target TCI state ID and a CORESET pair ID corresponding to the one target TCI state ID, in which the one target TCI state ID is configured to identify the first number of TCI states.

Furthermore, on one hand, in the method for beam indication provided in embodiments of the disclosure, the first signaling includes a MAC CE signaling.

In response to the first signaling including the MAC CE signaling, the target TCI state ID is a target TCI state ID activated by the MAC CE signaling in a TCI state ID list.

On the other hand, in the method for beam indication provided in embodiments of the disclosure, the first signaling includes a DCI signaling.

In response to the first signaling includes the DCI signaling, the target TCI state ID is one of a plurality of TCI state IDs indicated by the MAC CE.

In some embodiments, the plurality of TCI state IDs indicated by the MAC CE are a plurality of TCI state IDs in a TCI state ID list.

In an implementation manner, in the method for beam indication provided in embodiments of the disclosure, the first signaling includes a DCI signaling, and the DCI signaling is configured to indicate a codepoint. The first signaling also includes a second MAC CE. The second MAC CE is configured to indicate a CORESET ID or a CORESET pair ID, and a target TCI state ID, corresponding to the codepoint.

In embodiments of the disclosure, the implementation of indicating the beam information corresponding respectively to the first number of CORESETs involved in the implementation of realizing the method for beam indication by the network device side is the same as the implementation of indicating the beam information corresponding respectively to the first number of CORESETs by the terminal side, and which are similar. For descriptions which are not detailed enough in the implementation of the method for beam indication by the network device, reference may be made to the relevant descriptions of the above embodiments.

Furthermore, the method for beam indication provided in embodiments of the disclosure can be applicable to a method for realizing beam indication by interaction between the terminal and the network device. The terminal and the network device each has an implementation function for executing the above method for beam indication, which will not be described in detail herein.

It can be understood that, the first number involved in the method for beam indication provided in the foregoing embodiments of the disclosure may be one or more, and the typical value is two.

In an example, the method for beam indication provided in embodiments of the disclosure uses the indication signaling to jointly indicate the beam information of the plurality of (typically 2) CORESETs.

The indication signaling is the MAC CE signaling. The MAC CE signaling indicates one piece of beam information corresponding respectively to each of two CORESETs.

In a possible implementation manner, the MAC CE indicates two activated target TCI state IDs, and one CORESET ID corresponding to each target TCI state ID.

In a possible implementation manner, the MAC CE indicates two activated target TCI state IDs, and one CORESET pair ID corresponding to the two activated target TCI state IDs.

In a possible implementation manner, the MAC CE indicates one activated TCI state ID, and one CORESET pair ID corresponding to the activated TCI state ID.

The indication signaling is the DCI signaling. The DCI signaling indicates one piece of beam information respectively corresponding to each of two CORESETs.

In a possible implementation manner, the DCI signaling indicates two target TCI state IDs, and indicates one CORESET ID corresponding to each target TCI state ID.

In a possible implementation manner, the DCI signaling indicates two target TCI state IDs, and one CORESET pair ID corresponding to the two target TCI state IDs.

In a possible implementation manner, the DCI signaling indicates one target TCI state ID, and one CORESET pair ID corresponding to the target TCI state ID.

The method for beam indication provided in embodiments of the disclosure proposes that when PDCCH candidates of the plurality of CORESETs are used to repeatedly send the PDCCH of the multi-TRP, the joint beam indication is performed for the plurality of associated CORESETs, which can reduce the signaling overhead and reduce delay.

It should be noted that those skilled in the art can understand that various implementations/embodiments involved in the above embodiments of the disclosure may be used in conjunction with the foregoing embodiments or may be used independently. Whether used alone or in conjunction with the foregoing embodiments, the implementation principles are similar. In the implementation of the disclosure, some of the embodiments are described in terms of implementations that are used together; of course, those skilled in the art can understand that such examples are not intended to limit the embodiments of the disclosure.

Based on the same concept, embodiments of the disclosure also provide an apparatus for beam indication.

It can be understood that, in order to implement the above-mentioned functions, the apparatus for beam indication provided in embodiments of the disclosure includes corresponding hardware structures and/or software modules for executing various functions. Combining with the units and algorithm steps of each example disclosed in the embodiments of the disclosure, the embodiments of the disclosure can be implemented in hardware or a combination of hardware and computer software. Whether functions are performed by hardware or computer software driving hardware depends on specific applications and design constraints of the technical solutions. Those skilled in the art may use different manners to implement the described functions for each specific application, but such implementation should not be considered beyond the scope of the technical solutions of the embodiments of the disclosure.

Figure 8:
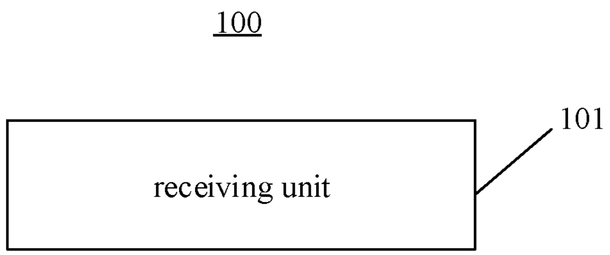
FIG. 8 is a block diagram of an apparatus for beam indication, according to some embodiments.

FIG. 8 is a block diagram of an apparatus for beam indication, according to some embodiments. Referring to FIG. 8, the apparatus 100 for beam indication includes a receiving unit 101.

The receiving unit 101 is configured to receive a first signaling, in which the first signaling is configured to indicate beam information of a plurality of CORESETs.

In an implementation manner, the first signaling is configured to indicate beam information corresponding respectively to a first number of CORESETs.

In an implementation manner, the first signaling is configured to indicate the first number of target TCI state IDs and CORESET IDs corresponding to respective target TCI state IDs in the first number of target TCI state IDs, in which each target TCI state ID corresponds to one TCI state.

In an implementation manner, the first signaling is configured to indicate the first number of target TCI state IDs and a CORESET pair ID corresponding to the first number of target TCI state IDs, in which the CORESET pair includes CORESETs corresponding to respective target TCI state IDs in the first number of target TCI state IDs and each target TCI state ID corresponds to one TCI state.

In an implementation manner, the first signaling is configured to indicate one target TCI state ID and a CORESET pair ID corresponding to the one target TCI state ID, in which the one target TCI state ID is configured to identify the first number of TCI states, and the CORESET pair includes CORESETs corresponding to respective TCI states in the first number of TCI states.

In an implementation manner, the first signaling includes an MAC CE.

In an implementation manner, the target TCI state ID is a target TCI state ID activated by the MAC CE signaling in a TCI state ID list.

In an implementation manner, the first signaling includes a DCI signaling.

In an implementation manner, the target TCI state ID is one or more of a plurality of TCI state IDs indicated by an MAC CE.

In an implementation manner, the plurality of TCI state IDs indicated by the MAC CE are a plurality of TCI state IDs in a TCI state ID list.

In an implementation manner, the DCI signaling is configured to indicate a codepoint and the first signaling further includes a second MAC CE; the second MAC CE is configured to indicate a CORESET ID corresponding to the codepoint or a CORESET pair ID corresponding to the codepoint, and a target TCI state ID corresponding to the codepoint.

Figure 9:
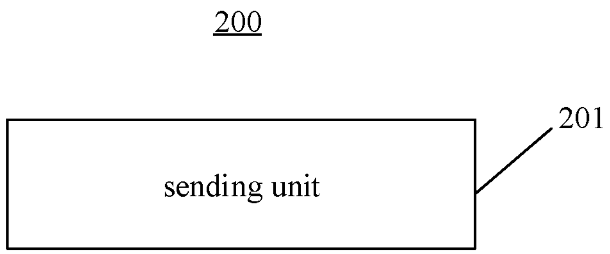
FIG. 9 is a block diagram of an apparatus for beam indication, according to some embodiments.

FIG. 9 is a block diagram of an apparatus for beam indication, according to some embodiments. Referring to FIG. 9, the apparatus 200 for beam indication is applicable to a network device and includes a sending unit 201.

The sending unit 201 is configured to send a first signaling, in which the first signaling is configured to indicate beam information of a plurality of CORESETs.

In an implementation manner, the first signaling is configured to indicate beam information corresponding respectively to a first number of CORESETs.

In an implementation manner, the first signaling is configured to indicate the first number of target TCI state IDs and CORESET IDs corresponding to respective target TCI state IDs in the first number of target TCI state IDs, in which each target TCI state ID corresponds to one TCI state.

In an implementation manner, the first signaling is configured to indicate the first number of target TCI state IDs and a CORESET pair ID corresponding to the first number of target TCI state IDs, in which the CORESET pair includes CORESETs corresponding to respective target TCI state IDs in the first number of target TCI state IDs and each target TCI state ID corresponds to one TCI state.

In an implementation manner, the first signaling is configured to indicate one target TCI state ID and a CORESET pair ID corresponding to the one target TCI state ID, in which the one target TCI state ID is configured to identify the first number of TCI states, and the CORESET pair includes CORESETs corresponding to respective TCI states in the first number of TCI states.

In an implementation manner, the first signaling includes an MAC CE.

In an implementation manner, the target TCI state ID is a target TCI state ID activated by the MAC CE signaling in a TCI state ID list.

In an implementation manner, the first signaling includes a downlink control information (DCI) signaling.

In an implementation manner, the target TCI state ID is one or more of a plurality of TCI state IDs indicated by an MAC CE.

In an implementation manner, the plurality of TCI state IDs indicated by the MAC CE are a plurality of TCI state IDs in a TCI state ID list.

In an implementation manner, the DCI signaling is configured to indicate a codepoint and the first signaling further includes a second MAC CE; the second MAC CE is configured to indicate a CORESET ID corresponding to the codepoint or a CORESET pair ID corresponding to the codepoint, and a target TCI state ID corresponding to the codepoint.

With respect to the apparatuses in the above embodiments, the specific manners for performing operations for individual modules therein have been described in detail in the embodiments regarding the methods, which will not be elaborated herein.

Figure 10:
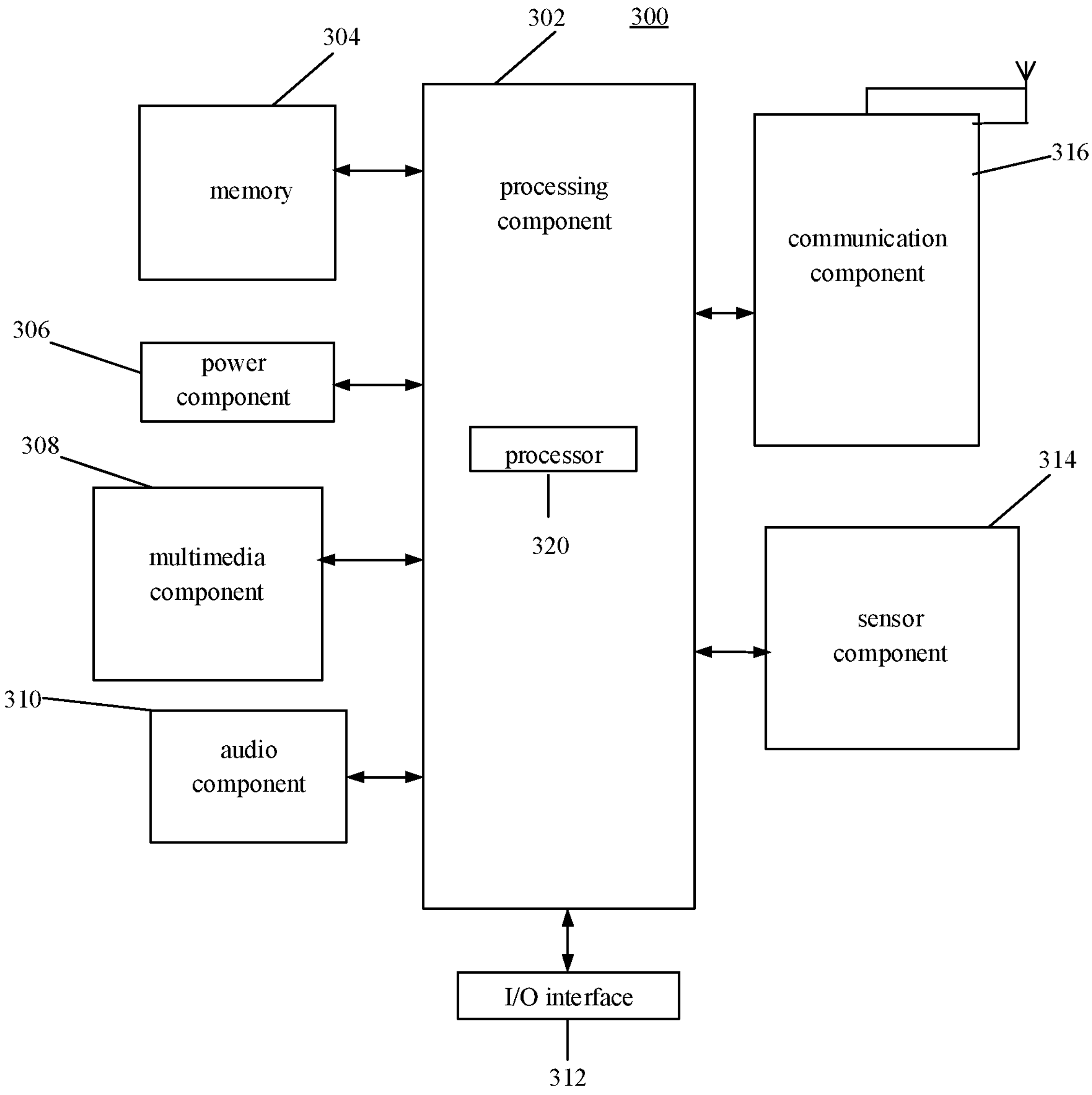
FIG. 10 is a block diagram of a device for beam indication, according to some embodiments.

FIG. 10 is a block diagram of a device 300 for beam indication, according to some embodiments. For example, the device 300 may be a mobile phone, a computer, a digital broadcast terminal, a messaging device, a gaming console, a tablet, a medical device, exercise equipment, a personal digital assistant, and the like.

Referring to FIG. 10, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 may include one or more processors 320 to execute instructions to perform all or part of the steps in the above described methods. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. The front camera and the rear camera may receive an external multimedia datum while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone ("MIC") configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide state assessments of various aspects of the device 300. For instance, the sensor component 314 may detect an open/closed state of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as WiFi, 2G, or 3G, or a combination thereof. In one exemplary embodiment, the communication component 316 receives a broadcast signal or broadcast associated information from an external broadcast management system via a broadcast channel. In one exemplary embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 304, executable by the processor 320 in the device 300, for performing the above-described methods. For example, the non-transitory computer-readable storage medium may be a ROM, a RAM, a CD-ROM, a magnetic tape, a floppy disc, an optical data storage device, and the like.

Figure 11:
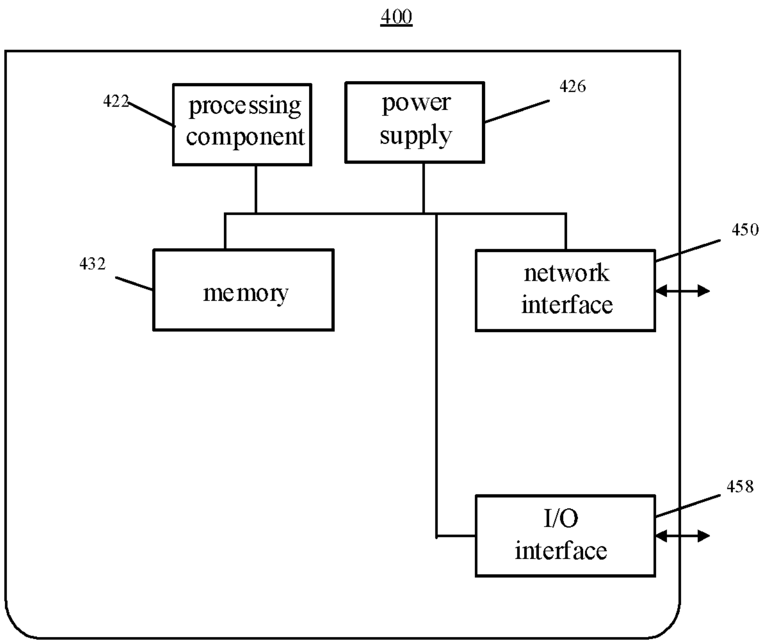
FIG. 11 is a block diagram of a device for beam indication, according to some embodiments.

FIG. 11 is a block diagram of a device 400 for beam indication, according to some embodiments. For example, the device 400 may be a server. Referring to FIG. 11, the device 400 may include a processing component 422 (which includes one or more processors), and a memory resource represented by a memory 432 for storing instructions executable by the processing component 422, such as application programs. The application programs stored in the memory 432 may include one or more modules. Each module may include a set of instructions. Furthermore, the processing component 422 may be configured to execute the instructions to perform the above-described methods.

The device 400 may also include a power supply 426 configured to perform power management of the device 400, a wired or wireless network interface 450 configured to connect the device 400 to the network, and an input output (I/O) interface 458. The device 400 may operate based on an operating system stored in the memory 432, such as Windows Server™, Mac OS X™, Unix™, Linux™, FreeBSD™ or the like.

In some embodiments, there is also provided a non-transitory computer-readable storage medium including instructions, such as included in the memory 432, executable by the processor 422 in the device 400, for performing the above-described methods. For example, the non-transitory computer-readable storage medium may be a ROM, a RAM, a CD-ROM, a magnetic tape, a floppy disc, an optical data storage device, and the like.

It should be further understood that in the disclosure, "plurality" or "multiple" may refer to two or more, and other quantifiers are similar. The term "and/or" may describe association relationships of associated objects, indicating that there may be three types of relationships, for example, A and/or B, which may mean: A exists alone, A and B exist at the same time, and B exists alone. The character "/" generally indicates that the associated objects before and after are in an "or" relationship. The singular forms "a," "an" and "the" are intended to include the plural forms as well, unless the context clearly indicates otherwise.

It is further understood that the terms "first", "second", etc. are used to describe various information, but the information should not be limited to these terms. These terms are only used to distinguish the same type of information from one another, and do not imply a particular order or level of importance. In fact, the expressions "first", "second" etc. are used completely interchangeably. For example, the first information may also be referred to as the second information, and similarly, the second information may also be referred to as the first information, without departing from the scope of the disclosure.

It is further to be understood that, although the operations in the embodiments of the disclosure are described in a specific order in the drawings, it should not be construed as requiring that the operations be performed in the specific order shown or the serial order, or requiring to perform all operations shown to obtain the desired result. In certain circumstances, multitasking and parallel processing may be advantageous.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for beam indication, performed by a terminal, the method comprising:

determining a first signaling, wherein the first signaling is configured to indicate beam information of a plurality of control resource sets;

wherein the first signaling is configured to indicate beam information corresponding respectively to a first number of control resource sets;

wherein the first signaling comprises a downlink control information (DCI) signaling;

wherein a target transmission configuration indication state identifier is one or more of a plurality of transmission configuration indication state identifiers indicated by a medium access control (MAC) control element (CE).

2. The method as claimed in claim 1, wherein the first signaling is configured to indicate a first number of target transmission configuration indication state identifiers and control resource set identifiers corresponding to respective target transmission configuration indication state identifiers in the first number of target transmission configuration indication state identifiers, wherein each target transmission configuration indication state identifier corresponds to one transmission configuration indication state, wherein the transmission configuration indication state identifier is used to identify a TCI state.

3. The method as claimed in claim 1, wherein the first signaling is configured to indicate a first number of target transmission configuration indication state identifiers and a control resource set pair identifier corresponding to the first number of target transmission configuration indication state identifiers, wherein the control resource set pair comprises control resource sets corresponding to respective target transmission configuration indication state identifiers in the first number of target transmission configuration indication state identifiers, and each target transmission configuration indication state identifier corresponds to one transmission configuration indication state, wherein the transmission configuration indication state identifier is used to identify a TCI state.

4. The method as claimed in claim 1, wherein the first signaling is configured to indicate one target transmission configuration indication state identifier and a control resource set pair identifier corresponding to the one target transmission configuration indication state identifier, wherein the one target transmission configuration indication state identifier is configured to identify a first number of target transmission configuration indication states, and the control resource set pair comprises control resource sets corresponding to respective transmission configuration indication states in the first number of transmission configuration indication states, wherein the transmission configuration indication state identifier is used to identify a TCI state.

5. The method as claimed in claim 1, wherein the first signaling comprises a medium access control (MAC) control element (CE).

6. The method as claimed in claim 5, wherein a target transmission configuration indication state identifier is activated by the medium access control (MAC) control element (CE) signaling in a transmission configuration indication state identifier list.

7. The method as claimed in claim 1, wherein the plurality of transmission configuration indication state identifiers indicated by the medium access control (MAC) control element (CE) are a plurality of transmission configuration indication state identifiers in a transmission configuration indication state identifier list.

8. The method as claimed in claim 1, wherein the DCI signaling is configured to indicate a codepoint and the first signaling further comprises a second medium access control (MAC) control element (CE);

the second medium access control (MAC) control element (CE) is configured to indicate a control resource set identifier corresponding to the codepoint or a control resource set pair identifier corresponding to the codepoint, and a target transmission configuration indication state identifier corresponding to the codepoint.

9. A method for beam indication, performed by a network device, the method comprising:

sending a first signaling, wherein the first signaling is configured to indicate beam information of a plurality of control resource sets;

wherein the first signaling is configured to indicate beam information corresponding respectively to a first number of control resource sets;

wherein the first signaling comprises a downlink control information (DCI) signaling;

wherein a target transmission configuration indication state identifier is one or more of a plurality of transmission configuration indication state identifiers indicated by a medium access control (MAC) control element (CE).

10. The method as claimed in claim 9, wherein the first signaling is configured to indicate a first number of target transmission configuration indication state identifiers and control resource set identifiers corresponding to respective target transmission configuration indication state identifiers in the first number of target transmission configuration indication state identifiers, wherein each target transmission configuration indication state identifier corresponds to one transmission configuration indication state, wherein the transmission configuration indication state identifier is used to identify a TCI state.

11. The method as claimed in claim 9, wherein the first signaling is configured to indicate a first number of target transmission configuration indication state identifiers and a control resource set pair identifier corresponding to the first number of target transmission configuration indication state identifiers, wherein the control resource set pair comprises control resource sets corresponding to respective target transmission configuration indication state identifiers in the first number of target transmission configuration indication state identifiers, and each target transmission configuration indication state identifier corresponds to one transmission configuration indication state, wherein the transmission configuration indication state identifier is used to identify a TCI state.

12. The method as claimed in claim 9, wherein the first signaling is configured to indicate one target transmission configuration indication state identifier and a control resource set pair identifier corresponding to the one target transmission configuration indication state identifier, wherein the one target transmission configuration indication state identifier is configured to identify a first number of target transmission configuration indication states, and the control resource set pair comprises control resource sets corresponding to respective transmission configuration indication states in the first number of transmission configuration indication states, wherein the transmission configuration indication state identifier is used to identify a TCI state.

13. A device for beam indication, comprising:

a processor; and a memory for storing instructions executable by the processor;

wherein the processor is configured to:

determine a first signaling, wherein the first signaling is configured to indicate beam information of a plurality of control resource sets;

wherein the first signaling is configured to indicate beam information corresponding respectively to a first number of control resource sets;

wherein the first signaling comprises a downlink control information (DCI) signaling;

wherein a target transmission configuration indication state identifier is one or more of a plurality of transmission configuration indication state identifiers indicated by a medium access control (MAC) control element (CE).

14. A device for beam indication, comprising:

a processor; and a memory for storing instructions executable by the processor;

wherein the processor is configured to perform the method for beam indication as claimed in claim 9.

15. A non-transitory computer-readable storage medium having stored therein instructions that, when executed by a processor of a mobile terminal, causes the mobile terminal to perform the method for beam indication as claimed in claim 1.

16. A non-transitory computer-readable storage medium having stored therein instructions that, when executed by a processor of a mobile terminal, causes the network device to perform the method for beam indication as claimed in claim 9.

* * * * *